United States Patent [19]

Sogi et al.

[11] Patent Number: 5,573,270
[45] Date of Patent: Nov. 12, 1996

[54] AIRBAG WITH INFLATION GAS DIFFUSER

[75] Inventors: Hidehito Sogi, Nagoya; Toru Ozaki, Toyota; Shigeyoshi Fukushima, Nagoya; Tomohiro Sugiura, Okazaki, all of Japan

[73] Assignee: Toyo Tire & Rubber Co., Ltd., Osaka, Japan

[21] Appl. No.: 345,491

[22] Filed: Nov. 28, 1994

[30]  Foreign Application Priority Data

| Nov. 26, 1993 | [JP] | Japan | 5-320970 |
| Jan. 12, 1994 | [JP] | Japan | 6-014910 |
| Mar. 18, 1994 | [JP] | Japan | 6-073947 |
| Jul. 7, 1994 | [JP] | Japan | 6-180957 |
| Sep. 30, 1994 | [JP] | Japan | 6-261815 |

[51] Int. Cl.$^6$ .................................. B60R 21/26
[52] U.S. Cl. .................. 280/740; 280/743.1; 280/743.2
[58] Field of Search ........................ 280/740, 729, 280/743.1, 743.2, 742, 728.1, 731, 730.1

[56]  References Cited

U.S. PATENT DOCUMENTS

| 5,078,423 | 1/1992 | Fujita | 280/743.2 |
| 5,172,933 | 12/1992 | Strasser | 280/740 |
| 5,249,824 | 10/1993 | Swann et al. | 280/729 |

FOREIGN PATENT DOCUMENTS

| 0600598 | 6/1994 | European Pat. Off. | 280/740 |
| 41 21 659 A1 | 1/1993 | Germany . | |
| 53-45574 | 12/1978 | Japan . | |
| 2-71052 | 5/1990 | Japan . | |
| 3-281460 | 12/1991 | Japan | 280/729 |
| 2265118 | 9/1993 | United Kingdom | 280/729 |

*Primary Examiner*—Eric D. Culbreth
*Assistant Examiner*—Peter C. English
*Attorney, Agent, or Firm*—Flynn, Thiel, Boutell & Tanis, P.C.

[57]  ABSTRACT

An airbag with an inflation gas diffuser comprising an inflator side cloth and an occupant side cloth both of a substantially equal size and a generally circular shape seamed together at outer peripheral portions thereof to form an outer configuration of the airbag. The inflator side cloth has a central opening through which to communicate with an inflator, and an internal cloth of a smaller size enclosed within the airbag to cover the opening. The internal cloth is partially seamed at its outer perimetric portion, to the inflator side cloth so as to form circumferentially alternately seamed portions and non-seamed open portions acting as a control passage for the inflation gas. The internal cloth may be circular, semicircular, dumbbell, polygonal, etc. The seamed portions each may consist of a main straight seam and two curved end seams.

23 Claims, 10 Drawing Sheets

AIRBAG WITH INFLATION GAS DIFFUSER

BACKGROUND OF THE INVENTION

1. Field of the Invention

This invention relates to an airbag for use in a vehicle occupant restraint system and more particularly, to an airbag whose inflation state is controlled by controlling gas flow of the inflator by means of an internal cloth enclosed within the airbag proper.

2. Statement of Related Art

As airbags of the type as stated above, for example, an airbag is known and disclosed in Japanese U.M. Laid-open Publication 2-71052 (1990), which comprises two circular cloths on an inflator side and an occupant side superposed and seamed together at respective outer peripheral portions thereof to form an external configuration of the airbag, the inflator side cloth having a central opening through which to insert the head part of the inflator, and an inside cloth, of substantially the same radius as the two cloths, interposed between the inflator side cloth and the occupant side cloth and seamed at its outer peripheral portion to both cloths. The inside cloth is formed discontinuously with cutouts at its outer periphery and seamed to the inflator side cloth further at its radially middle positions between the center point and the outer perimeter, the middle positions being located at intervals along the perimetric portions where the cutouts are not formed.

With the airbag thus constructed, gas released from the inflator strikes the inside cloth to flow in radial directions toward the outer peripheral portion of the airbag and further passes through the cutouts to inflate the airbag in a flat flaring shape.

However, the foregoing airbag is disadvantageous in the aspects of cost and manufacturing procedure since the inside cloth is of a large size and fashioned in a complicated shape because of the formation of the cutouts, and sewing must be applied in the intermediate positions as well as the outer peripheral portions. A further problem with the airbag is that vent holes are formed in the inflator side cloth in a range in which the inside cloth is attached to because of the large size of the inside cloth and consequently, gas from the inflator strikes the inside cloth and is escaped out of the vent holes in the course of inflation of the airbag.

Another airbag restraint system for a motor vehicle is disclosed in Japanese Patent Publication 53-45574 (1978), according to which the airbag has therein an insert that is automatically inflatable by the gas in the event that a deceleration of the vehicle exceeding over a predetermined speed takes place and, upon inflation by the gas, is thrusted out in a parachute form in a major flow direction of the gas from its housing position within the airbag.

This is only aimed at diminishing the generation of sound when the airbag is inflated so that it does no harm to the human body, and no control of flow of the inflator gas is taken into account and pursued.

Another airbag is proposed in Japanese Patent Laid-open Publication 3-281460 (1991), which is constructed of a small-volume inner bag housed in a large-volume outer bag so that inflation gas pressure may be supplied through the inner bag to the outer bag. However, the inner bag itself must have holes for passage of the gas because of restriction by its bag shape, and fabrication of the airbag entails a laborious task and a cost increase.

Further, German Patent Laid-open Publication (DEOS) 41 21 659 A1 discloses an airbag within which a covering is provided over the opening of the inflator side cloth. The covering has a plurality of holes for passage of gas, which not only causes a reduction in strength, but also allows a main flow of the gas to pass through the holes and to flow direct into the airbag. Consequently, the airbag is not satisfactory for the control of gas flow.

In view of the defects or problems as described above, this invention has been accomplished, and its general object is to provide an improved airbag capable of controlling the gas flow of the inflator and suppressing the escape of the gas out of vent holes by another construction of an inside cloth.

Further object is to manufacture the airbag at low cost and in easier process steps.

SUMMARY OF THE INVENTION

The invention suited to the aforementioned objects consists of an airbag for use in a vehicle occupant restraint system which comprises an inflator side cloth and an occupant side cloth both having a generally circular shape and generally the same size. The inflator side and the occupant side cloths are seamed together at respective outer peripheral portions thereof to form an outer configuration of the airbag and being adapted to be connected to an inflator for releasing gas into the airbag for inflation thereof and to face toward a vehicle occupant, respectively. The inflator side cloth has a central opening through which to communicate with the inflator; and an internal cloth, of a much smaller size than the inflator side cloth, attached within the airbag to the inflator side cloth in a manner covering concentrically the central opening so as to receive a main flow of the gas, the internal cloth being seamed, at its outer perimetric portion, partly to the inflator side cloth at intervals along the perimeter thereof, thus forming alternately seamed portions and non-seamed portions, the non-seamed portions forming control passages for controlling flow of the gas.

According to a preferred embodiment of this invention, the airbag is characterized in that the internal cloth is configured in a semi-circular shape in order to further control positively the gas flow of the inflator, and constructed so that its circular arc side is located to be on the upper side of the airbag when mounted on the vehicle and seamed partly to the inflator side cloth along the perimeter of the circular arc side and its straight line side is open toward the lower side of the airbag in mounted state without seaming to the inflator side cloth, thus forming the internal cloth in a pocket-like shape.

According to another embodiment, the internal cloth may have a generally circular shape or polygonal shape (hexagonal, octagonal, heptagonal, nonagonal, decagonal, etc.).

In a further embodiment, the internal cloth is fashioned in a generally dumbbell shape consisting of a major generally circular or semi-circular part for control passages, a small circular part for reinforcing the surrounding of the opening and a linking part between the major part and the small part, and attached to the inflator side cloth so that the reinforcing part is seamed to the surrounding of the central opening, and the major part is folded up at the linking part to be superposed on the reinforcing part and is seamed at its perimetric portion partly to the inflator side cloth.

It is also advantageous for the air bag thus constructed that the seamed portions of the internal cloth to the inflator side cloth each consist of a rectilinear or curvilinear main seam line extending in a substantially orthogonally intersecting direction to a radial direction of the inflator side cloth and circular arc seam lines curving radially outwardly from both ends of the main seam line.

According to a further preferred embodiment, the internal cloth has an outer crenulated margin configured alternately as salient and reentrant circular arc forms and is seamed partly to the inflator side cloth at the outer perimetric margin, thus forming a continuous stitching such that only the salient portions of the internal cloth are seamed to the inflator side cloth and the reentrant portions are not seamed to the inflator side cloth, but have only stitch lines on the inflator side cloth appearing there. Otherwise, the internal cloth has a generally circular or polygonal shape and is seamed at its outer perimetric portion partly to the inflator side cloth, forming continuously a crenulated stitching (an alternately salient and reentrant stitching) along the perimeter, thus forming seamed portions at the reentrant positions inside the internal cloth and non-seamed, but stitched portions at the salient positions outside the internal cloth.

According to a still further embodiment, the inflator side cloth is formed with vent holes outside the range in which the internal cloth is attached. It is advantageous that the internal cloth covering the central opening to be seamed around it is formed integrally with a reinforcing cloth for the vent holes to be seamed around them as a one-piece cloth.

In another aspect of this invention, there is also provided an airbag which comprises an inflator side cloth and an occupant side cloth both having generally the same size and a generally circular shape, the inflator side and occupant side cloths being seamed together at respective outer peripheral portions thereof to form an outer configuration of the airbag and being adapted to be connected to an inflator for releasing gas into the airbag for inflation thereof and to face toward a vehicle occupant, respectively, the inflator side cloth having a central opening through which to communicate with the inflator; and an internal cloth, of a smaller size than the inflator side cloth, attached within the airbag to the inflator side cloth in a manner covering the central opening concentrically so as to receive a main flow of the gas, the internal cloth having slits formed in the perimetric portions thereof at intervals along the outer perimeter and being seamed to the inflator side cloth at the perimetric portion outside the slits.

It is further preferred that the airbag further comprise therein straps extending from near the seamed portions of the internal cloth to the occupant side cloth, thus connecting both the cloths at a given length thereby to regulate the deployment shape of the airbag.

The straps may be integrally formed with the internal cloth.

In the airbag according to this invention, gas blown off from the inflator hits the internal cloth to flow in radial directions and passes through the non-seamed portions as control passages to reach the outer peripheral part of the airbag. That is, the airbag commences to deploy from the outer peripheral part and consequently, a fully inflated shape of the airbag is obtainable rapidly.

Since the internal cloth is much smaller as compared with the inflator side cloth and a simple construction of seaming the internal cloth to the inflator side cloth is adopted, the number of process steps and cost for the production of the airbag can be diminished.

Further, the vent holes are formed in the inflator side cloth outside a range in which the internal cloth is provided and particularly, on the outer peripheral side outside the seamed portions, whereby at an initial stage of generation of gas from the inflator, releasing of the gas out of the vent holes can be significantly suppressed and the gas can be effectively used.

It is also possible to promote the inflation of the airbag toward its lower side by seaming the internal cloth of a semicircular shape in a pocket-like form.

In the embodiment where the internal cloth is fashioned in a generally dumbbell shape and its major circular part is superposed on the reinforcing part by folding up at the linking part and seamed partly to the inflator side cloth, the linking part serves as a strong seam substitute as a fixed part of the internal cloth, which enables to reduce the discontinuous seaming of the internal cloth by one or two places as compared with other examples.

Again where the seamed portions assume each circular arc ends, a tensile force of the internal cloth exerted on the circular arc ends can be received lineally from lateral sides of the curved ends, with the result that concentration of the tensile force upon the curved ends can be suppressed, in contrast to the case with rectilinear ends of the seamed portions where the ends are susceptible to a tensile stress of the internal cloth from the ends as a dot.

Further where the slits are formed near the outer perimetric portion of the internal cloth and the internal cloth is seamed continuously in its whole perimeter outside the slits, it is possible to diminish the process steps for the production of the airbag.

This is also the case where a continuous stitching is applied around the outer perimeter of the internal cloth in whole perimeter thereof and stitched, but non-seamed portions and seamed portions are alternately formed.

In a further embodiment, the provision of the straps makes it possible to vastly alleviate the tensile stress on the straps because the occupant side cloth does not undergo direct flow of the inflator gas. Consequently, it is sufficient that the straps have only a strength that withstands the inner pressure of the airbag, and it is possible to make the thickness, width and number of the straps used small as well as to use an inexpensive material of a strength not as high as conventional materials.

The above brief description, as well as further objects and features of the invention, will be more fully understood by reference to the following detailed description of the preferred embodiments of the invention when taken in conjunction with the accompanying drawings.

DESCRIPTION OF THE PREFERRED EMBODIMENTS

Figures 1, 3:
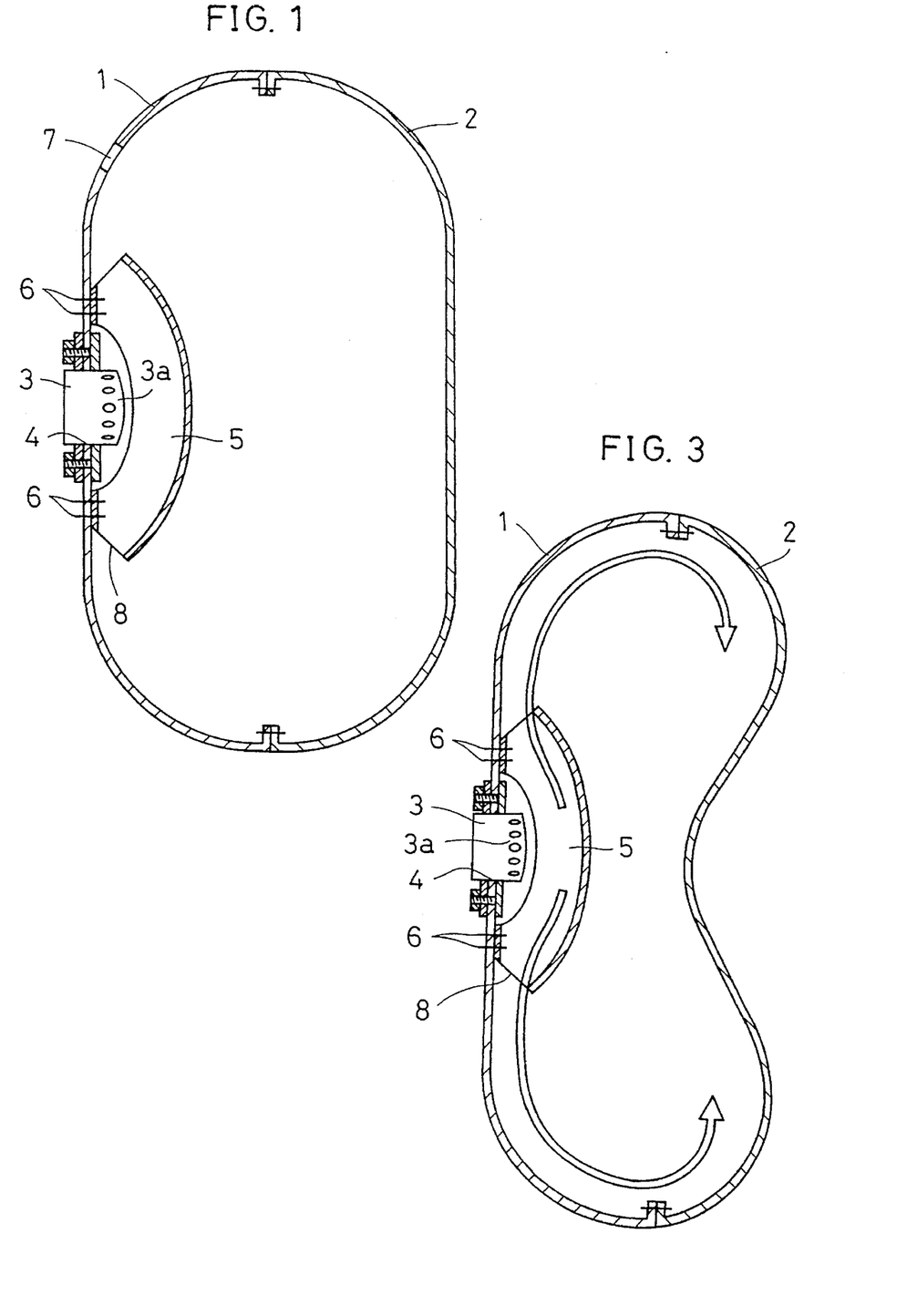
FIG. 1 is a sectional view of a first example of an airbag according to this invention showing its fully inflated state.
FIG. 3 is a similar sectional view of the airbag in FIG. 1 showing the flow of the inflator gas in the course of inflation of the airbag.
Figure 2:
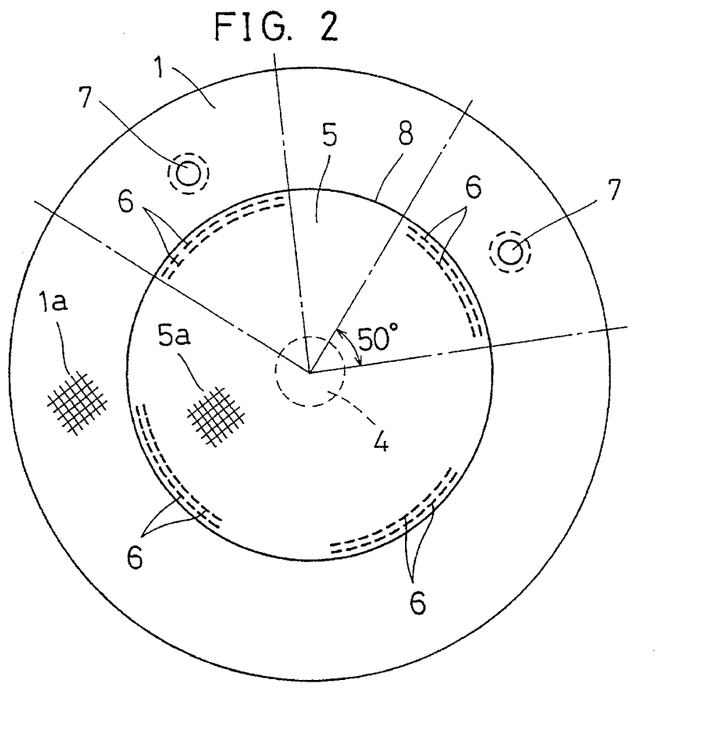
FIG. 2 is a plan view showing an example of an inflator side cloth surmounted by an internal cloth in the example of FIG. 1.

Now referring to FIGS. 1 and 2, a first example of an airbag according to this invention is shown, which comprises an inflator side cloth 1 and an occupant side cloth 2 seamed together at respective outer peripheral margins thereby to form an outer configuration of the airbag. The inflator side cloth 1 is apertured by a central opening 4 to fit over a head 3a of an inflator 3. Within the airbag, an internal cloth 5 of a generally circular shape is provided so as to cover the opening 4 concentrically.

Within the airbag, the internal cloth 5 has, for example, a diameter of 400 mm much smaller than the inflator side cloth 1 of 700 mm in diameter and is seamed at its outer perimetric portion to the inflator side cloth 1 discontinuously at regular intervals of a center angle of ca. 50°, thus forming circumferentially four seamed portions (seam lines) 6 (FIG. 2). The seam lines 6 are applied each as double concentrical seam lines having diameters of, for example, 360 mm and 362.5 mm by lockstitching at a pitch of 2.5 mm.

The internal cloth 5 and the inflator side cloth 1 in FIG. 2 are superposed so that respective crosswise and lengthwise threads 5a, 1a may be located mutually in the same directions, and a stitching thread for the seam lines 6 is applied at respective positions substantially in parallel with the threads 5a, 1a.

Vent holes 7 are formed in the inflator side cloth 1 outside the section to which the internal cloth 5 is attached, but in radially outward positions of the seamed portions 6. By this disposition of the vent holes 7, release of the gas from the vent holes 7 can be suppressed vastly.

As the inflator side cloth 1, the occupant side cloth 2 and the internal cloth 5 to be used, there may be mentioned, for example, a nylon 66 woven fabric (420 denier, 40 ends/in× 40 picks/in) or a nylon 66 woven fabric coated on its one side with a silicone rubber (20 g/m$^2$), etc.

In the airbag thus constructed, gas dischargered from the inflator 3 hits the internal cloth 5 thereby to flow in radial directions and passes through non-seamed portions 8 of the internal cloth 5 between the seamed portions 6 to reach the outer peripheral part of the airbag as shown in FIG. 3. Henceforth, the airbag begins to deploy from the outer peripheral part thereof and accordingly, it is possible to obtain a nearly fully inflated shape rapidly.

Figure 4:
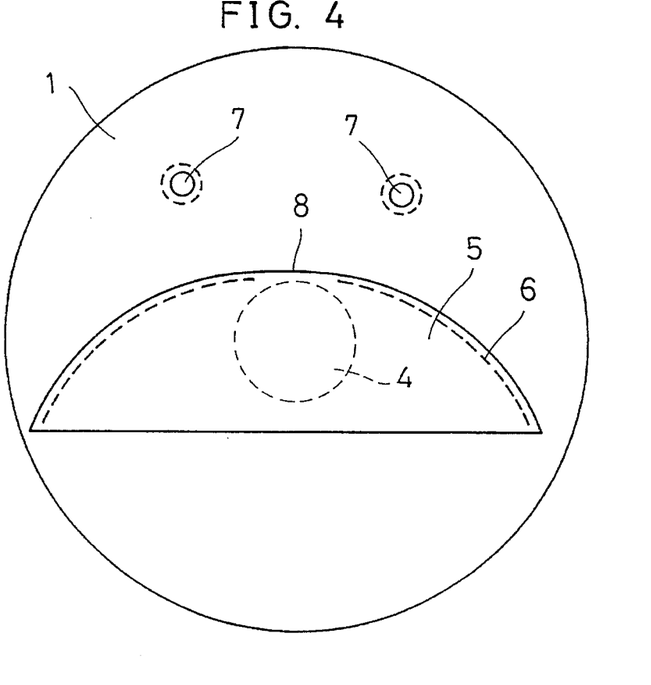
FIG. 4 is a plan view of a second example of an airbag pertaining to this invention showing another example of an internal cloth attached to an inflator side cloth.
Figure 5:
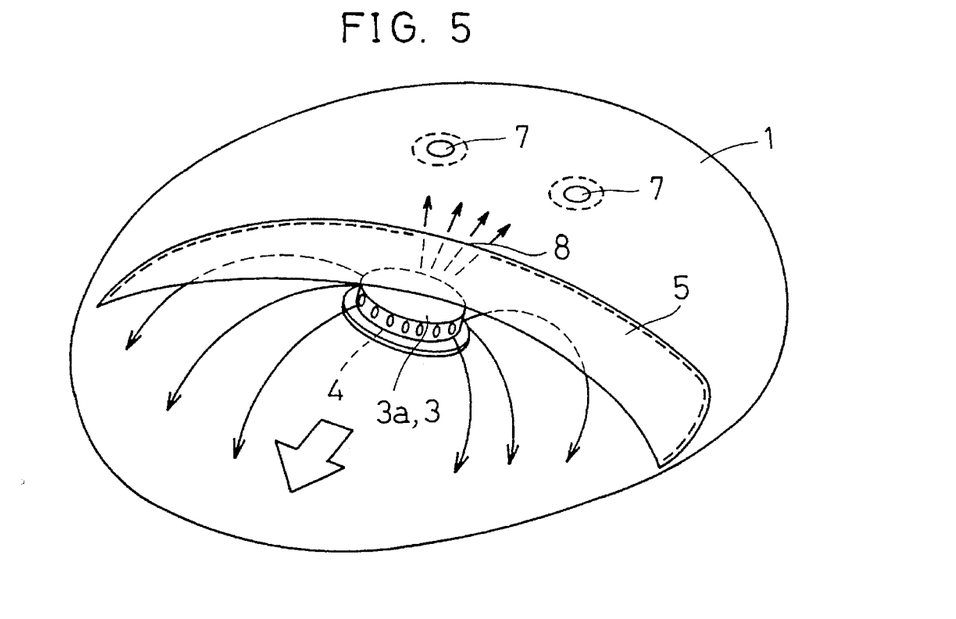
FIG. 5 is a perspective view of the inflator side cloth in FIG. 4 showing its state when the inflator is operated.
Figure 6:
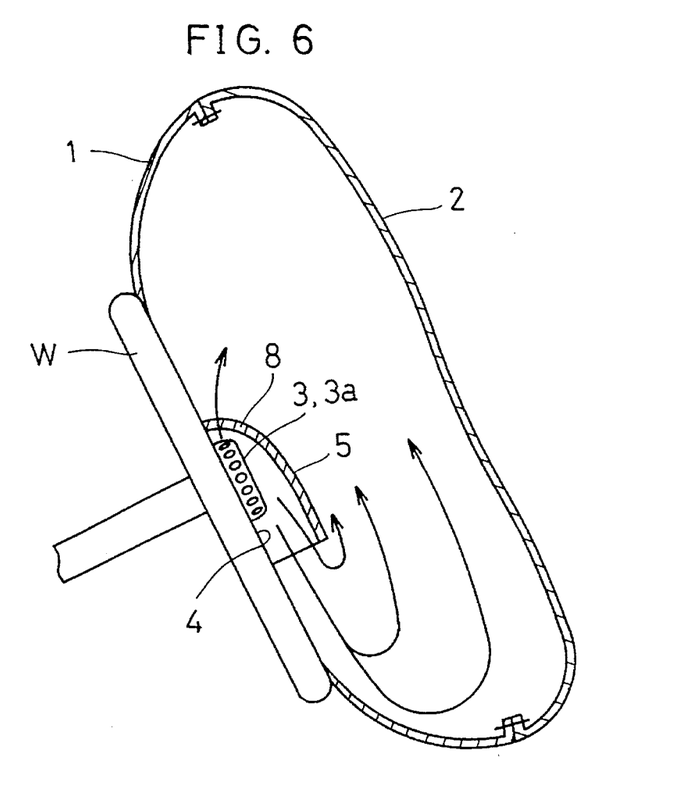
FIG. 6 is a sectional view of the airbag in the second example of FIG. 4 showing its state in the course of deployment.

In a second example as shown in FIGS. 4 to 6, the airbag is similarly constructed of the inflator side cloth 1 and occupant side cloth 2 both having a generally circular shape seamed together at respective outer peripheral portions to form an outer configuration of the airbag, the inflator side cloth being apertured in its center by the opening 4, in which the head 3a of the inflator 3 is adapted to be fitted. In this example, an internal cloth 5 of a semi-circular shape is attached, within the airbag, to the inflator side cloth 1 in a manner covering the opening 4 so as to control a flow of the gas of the inflator 3.

The semi-circular internal cloth 5 is attached by superposing it on the inflator side cloth 1, with its straight section and circular arc section oriented toward the lower side and upper side of the airbag when mounted on a vehicle, for example, its steering wheel W and seaming the upper circular arc section of the cloth 5 partly to the inflator side cloth 1, without seaming its middle portion 8.

By this construction, the internal cloth 5 forms a pocket-like enclosure opening toward the lower side of the airbag, when mounted, together with the seamed cloth 1, and also forms the non-seamed portion 8 functioning as outflow passage or orifice for gas, through which a part of the gas is vented toward the upper side of the airbag.

When the inflator 3 is operated, as shown in FIGS. 5, 6, the discharged gas flows along the circular arc section of the internal cloth 5 now taking a pocket-like shape and then deviated downwardly. Coincidently, a part of the as in the pocket-like enclosure passes through the outflow passage 8 thereby to expedite the upward inflation of the airbag.

By forming the outflow passage 8 in an appropriate size in this manner, it is possible to control, as desired, the inflation rate toward the upper side of the airbag.

Figure 7:
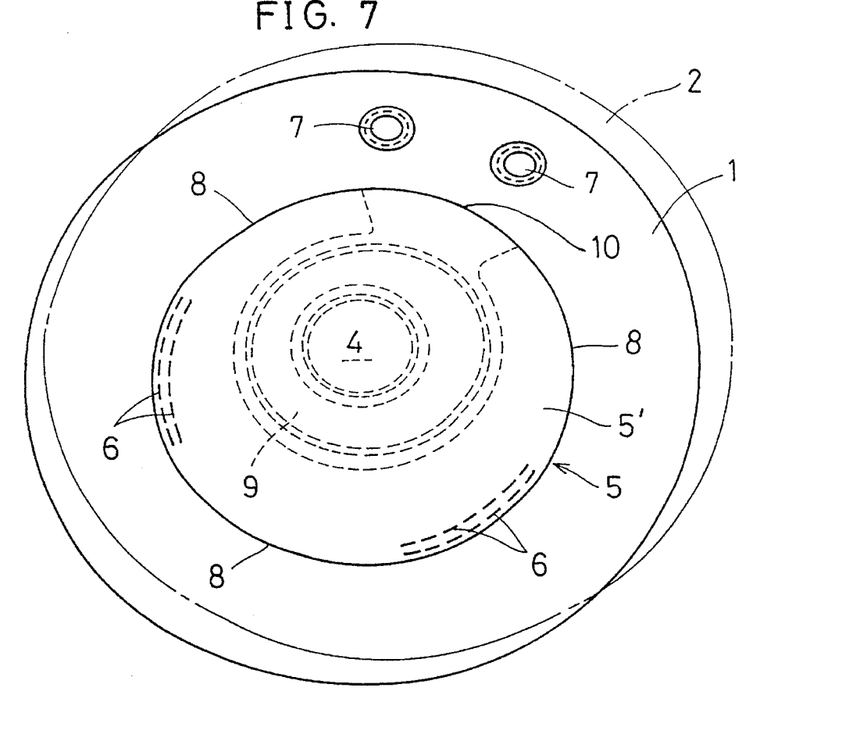
FIG. 7 is a perspective view of a third example of an airbag showing its essential part.
Figure 8:
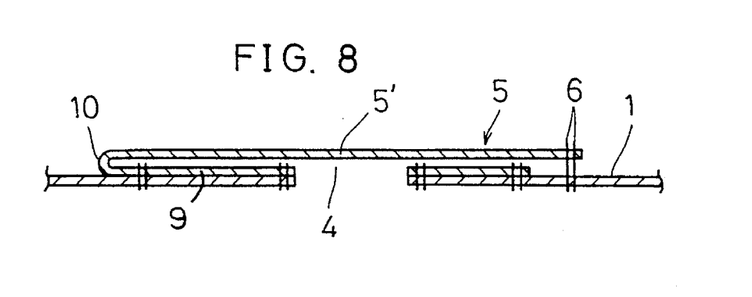
FIG. 8 is a partial sectional view of the airbag in FIG. 7.
Figure 9:
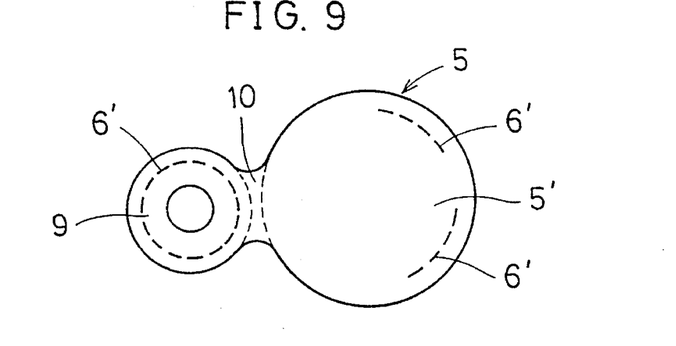
FIG. 9 is a plan view showing further example of an internal cloth in the example of FIG. 7.

In accordance with a third example of an airbag shown in FIGS. 7 to 9, the airbag is similarly constructed to the preceding examples except that the internal cloth 5 is configured in a generally dumbbell shape consisting of a major circular part 5' for controlling the gas passage, a small circular reinforcing part 9 for reinforcing the peripheral zone around the opening 4, and a linking part 10 between the former two 5', 9 (FIG. 9). In the major cloth part 5', the reference numeral 6' designates a sewing place to be seamed to the inflator side cloth 1.

The internal cloth 5 is seamed to the inflator side cloth 1 so that the reinforcing part 9 is superposed on the peripheral zone around the opening 4 and seamed to the peripheral zone at whole inner and outer peripheries thereof and the major part 5' for passage control of gas is folded up at the linking part 10, superposed on the reinforcing part 9 over the inflator side cloth 1 and firmly fastened at an outer peripheral portion of the major part 5' except for the linking part 10 to the inflator side cloth 1 by discontinuous seaming at regular intervals thereby to form two seamed portions 6 and non-seamed portions 8 (FIGS. 7, 8).

As a consequence, the internal cloth 5 is fastened to the inflator side cloth 1 equidistantly at three places of the two seamed portions 6 and one linking part 10. The non-seamed portions 8 located between the linking part 10 and the seamed portions 6 and between the seamed portions 6 serve as a control passage for inflator gas.

The linking part 10 of the internal cloth 5 between the major part 5' and the reinforcing part 9 may be varied appropriately in breadth. When the breadth of the linking part 10 is made larger and vent holes 7 are located around the linking part 10, it is possible to suppress excessive venting of the inflator gas from the vent holes 7 when the airbag is deployed.

The dumbbell-like configuration of the internal cloth 5 is advantageous in that when the internal cloth 5 is formed into an airbag, the linking part 10 serves as a fixing part of the major part 5' for controlled passage of gas and accordingly, as a substitute for a firm seam, whereby the place of discontinuously seamed portions 6 for fixing can be reduced from four places in the first example to two or three places.

Figure 10:
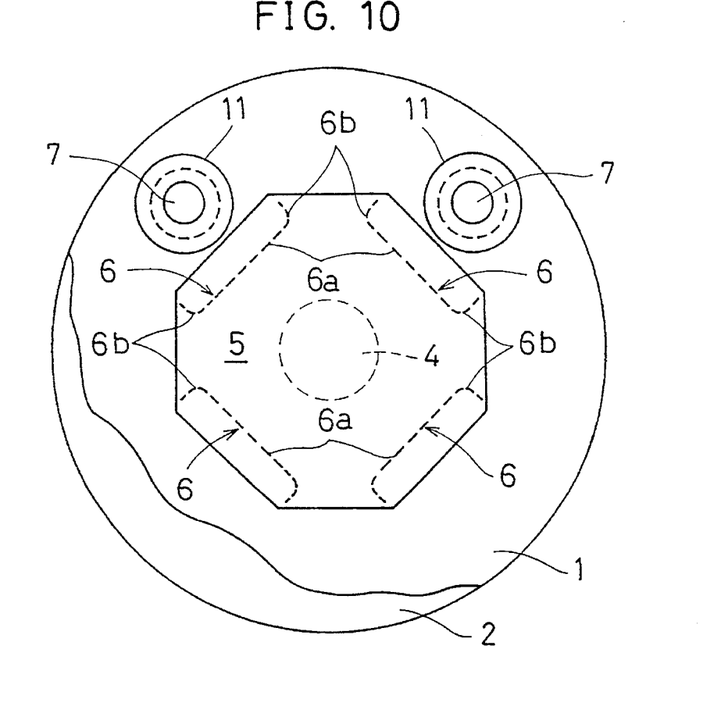
FIG. 10 is a partly cutaway plan view of a fourth example of an airbag showing another example of seamed portions.

A fourth example of airbag shown in FIG. 10 is characterized in that the internal cloth 5 is configured in an octagonal shape and seamed at its outer perimetric portion to the inflator side cloth 1 discontinuously at regular intervals thus forming four seamed portions 6.

Each of the seamed portions 6 consists of a main straight seam line 6a extending in an orthogonally intersecting direction to a radial direction and both circular arc seam lines 6b curve radially outwardly from the straight seam line 6a at both sides thereof. The main seam line 6a may assume a curvilinear line in the form of a relatively large circular arc concentrical to the opening 4. The internal cloth 5 naturally may assume other polygonal shapes.

The vent holes 7 are located in the radially outer peripheral portion of the inflator side cloth 1 outside the seamed portions 6 and a reinforcing cloth 11 is superposed over and seamed to the vent holes 7, as shown in FIG. 10.

Figure 11:
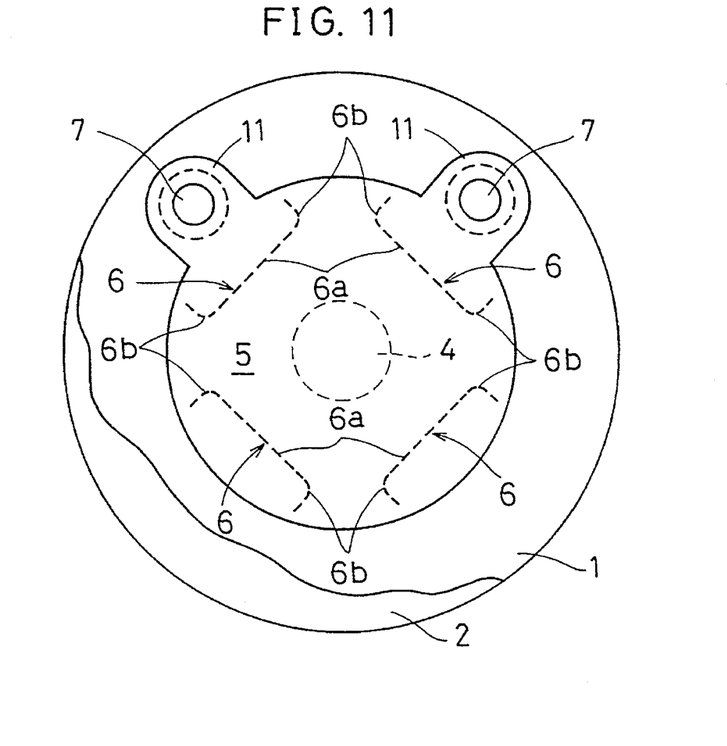
FIG. 11 is a partly cutaway plan view of a variant to the airbag in FIG. 10.

The reinforcing cloth 11 for vent holes 7 can be rendered integral with the internal cloth 5 to form a one-piece cloth as shown in FIG. 11, whereby it is possible to reduce components for the construction of the airbag and process steps thereof.

Figure 12:
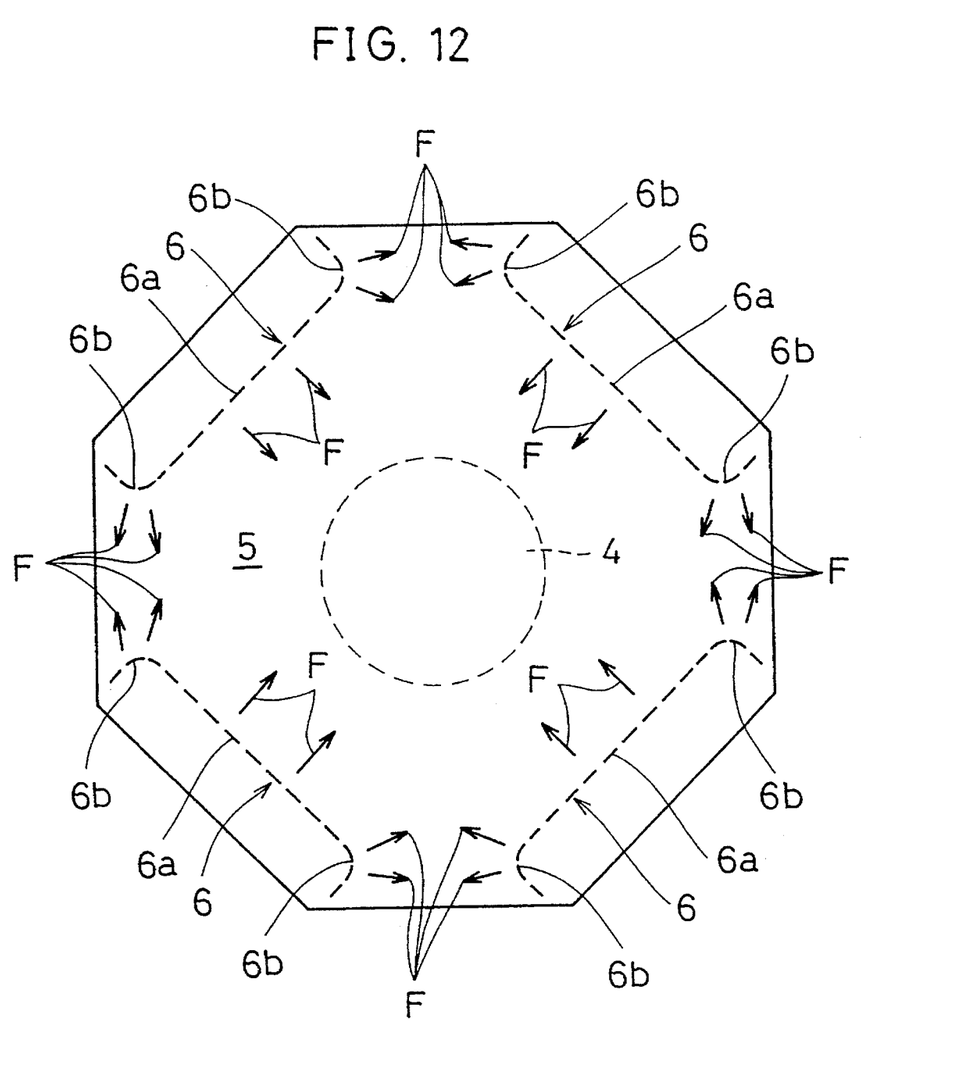
FIG. 12 is an illustrative representation showing tensile force exerted on seamed portions of an internal cloth of the airbag in this invention.

In the airbag thus constructed, the formation of the seam lines 6 in a circular arc form at both ends 6b imposes a tensile force F of the internal cloth 5, which is exerted on the ends 6b, to be catched in a linear manner sideward from the circular arc ends 6b. Consequently, the concentration of the tensile force F on the seam ends 6b can be suppressed, as shown in FIG. 12, as compared with the example of straight line seam ends where the seams are susceptible to receive the tensile force of the internal cloth from the end sides as a dot.

Figure 13:
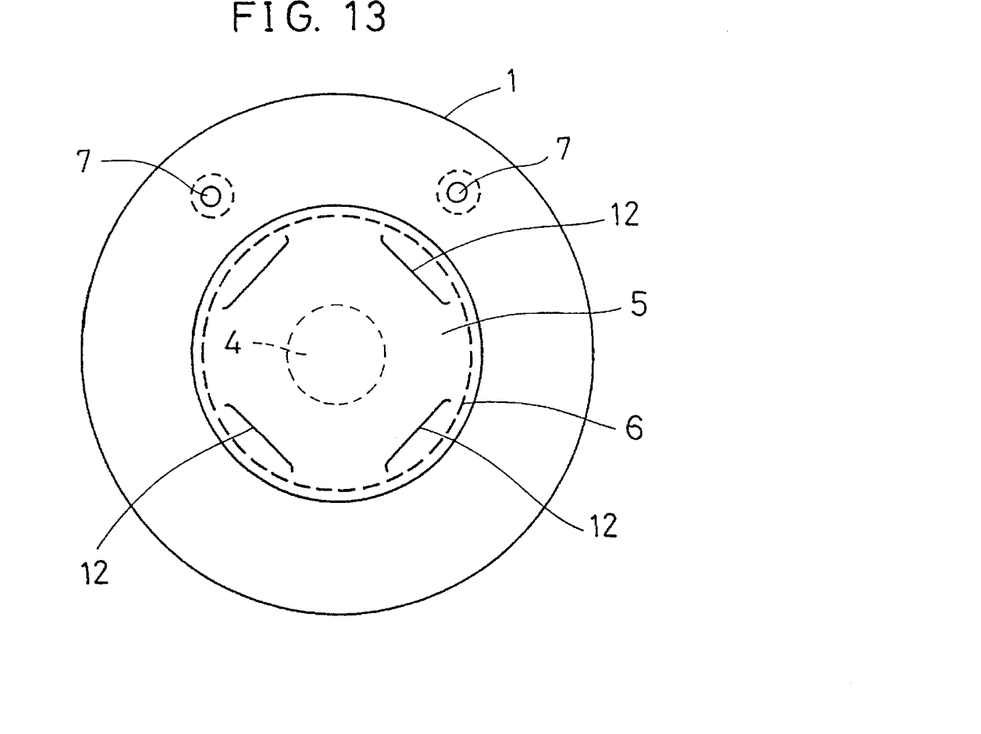
FIG. 13 is a plan view of a fifth example of an airbag showing a still further example of an inflator side cloth surmounted by an internal cloth.

FIG. 13 shows further a fifth example of airbag, wherein the inflator side cloth 1 surmounted by an internal cloth 5 is illustrated.

The internal cloth 5 to be superposed on the inflator side cloth 1 is formed with four slits 12 in its outer marginal portion at regular intervals, simultaneously when the internal cloth 5 is cut out. Then, the internal cloth 5 is fitted to the inflator side cloth 1 so as to cover the opening 4 and seamed at the outer marginal portion thereof outside the slits 12 to the inflator side cloth 1 in a whole perimeter to form an endless seam line 6.

Figure 14:
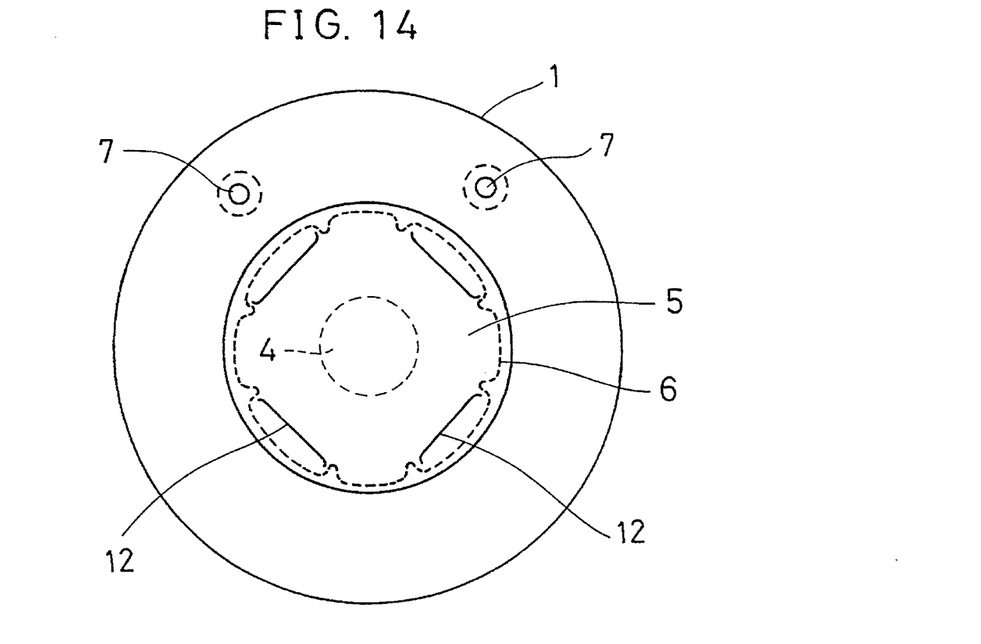
FIG. 14 is a plan view of a sixth example of an airbag as a variant to the example in FIG. 13 with its occupant side cloth omitted.

In FIG. 14, a sixth example of airbag as a variant to the preceding fifth example is shown, in which the internal cloth 5 is formed with four slits 12 simultaneously with cutting of the cloth, and superposed on the inflator side cloth 1 to cover the opening 4. Stitching is applied similarly along the perimeter of the internal cloth 5 in a whole perimeter so that the stitching is deviated slightly radially inwardly near both ends of the slits 12, and the internal cloth 5 is thus seamed to the inflator side cloth 1 to form an endless seam 6.

This modified stitching mitigates stress concentration on the slit ends due to gas flow upon deployment of the airbag, thereby to avoid cleavage of the slits.

In the preceding examples, the form of the slits 12 can be curved at their both ends, thereby to avoid cleavage of the slits, or can be rectilinear.

Figure 15:
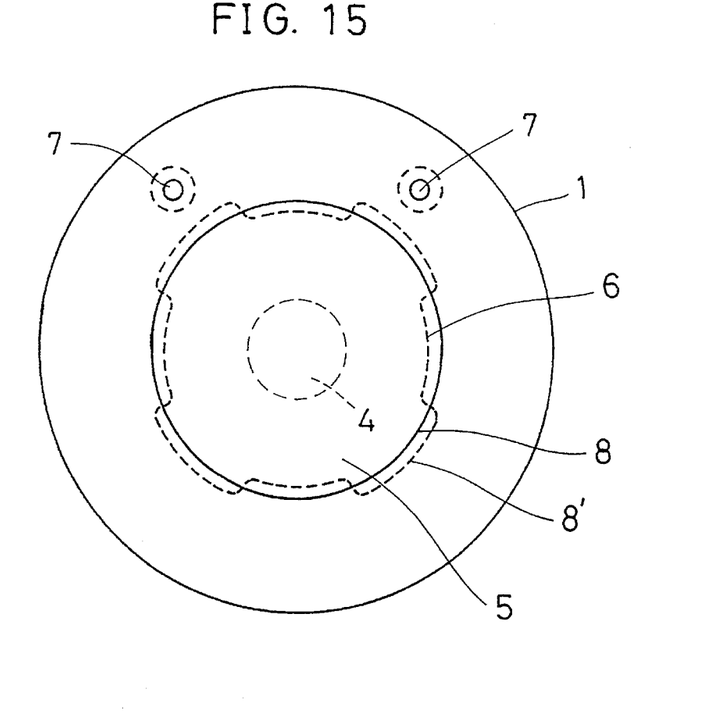
FIG. 15 is a plan view of a seventh example of an airbag showing further example of a stitching.

According to a seventh example of airbag in FIG. 15, the internal cloth 5 of a circular shape is superposed on the inflator side cloth 1 and seamed partly thereto by a continuous stitching 6 and 8' in a whole circumference of the internal cloth 5. The stitching is applied as alternately salient and reentrant stitching lines of a circular arc form outside and inside the outer perimeter of the internal cloth 5, thus forming a continuous crenulated stitching consisting of seamed portions 6 and stitched, but non-seamed portions 8' which are located near the non-seamed portions 8 of the internal cloth 5. This crenulated stitching enables the control of gas flow through the non-seamed portions 8 near the stitched, non-seamed portions 8' without slits.

Figure 16:
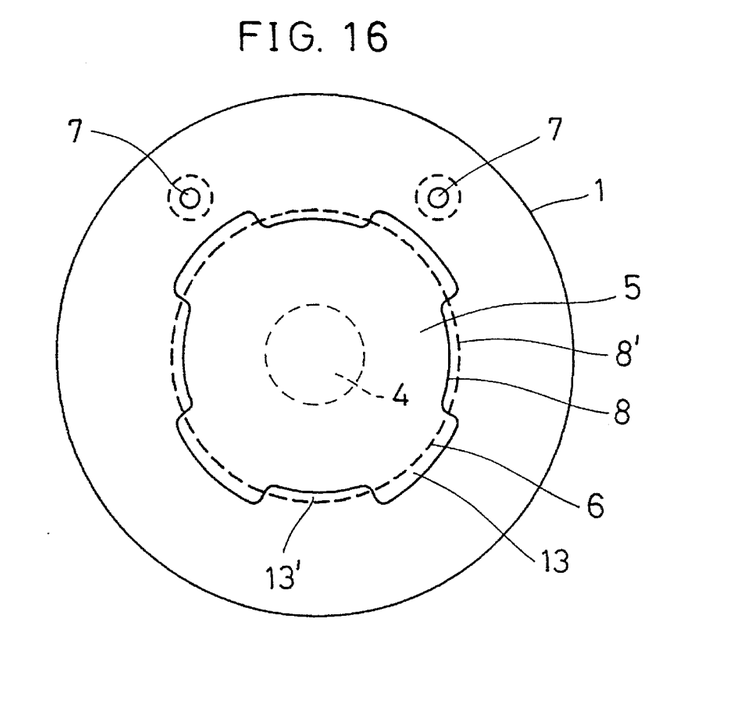
FIG. 16 is a plan view of an eighth example of an airbag as a variant to the example of FIG. 15 with its occupant side cloth omitted.

A modified version of the seventh example is shown in FIG. 16. The internal cloth 5 is configured in a modified circular shape having a crenulated outer perimeter so that four circular arc salient portions 13 are formed at regular intervals between circular arc reentrant portions 13' complementary with the salient portions. The internal cloth 5 is superposed on the inflator side cloth 1 and seamed partly thereto by applying a continuous (endless) stitching in a circular manner alternately within and outside the internal cloth 5 at the portions 13 and 13', whereby seamed portions 6 and stitched, but non-seamed portions 8' are formed at the salient portions 13 and the reentrant portions 13', respectively.

Also in these examples of the airbags, discharged gas from the inflator 3 hits the internal cloth 5 and flows through the non-seamed portions 8 of the internal cloth 5 in radial directions, which promotes the deployment of the airbag toward its outer periphery.

Figure 17:
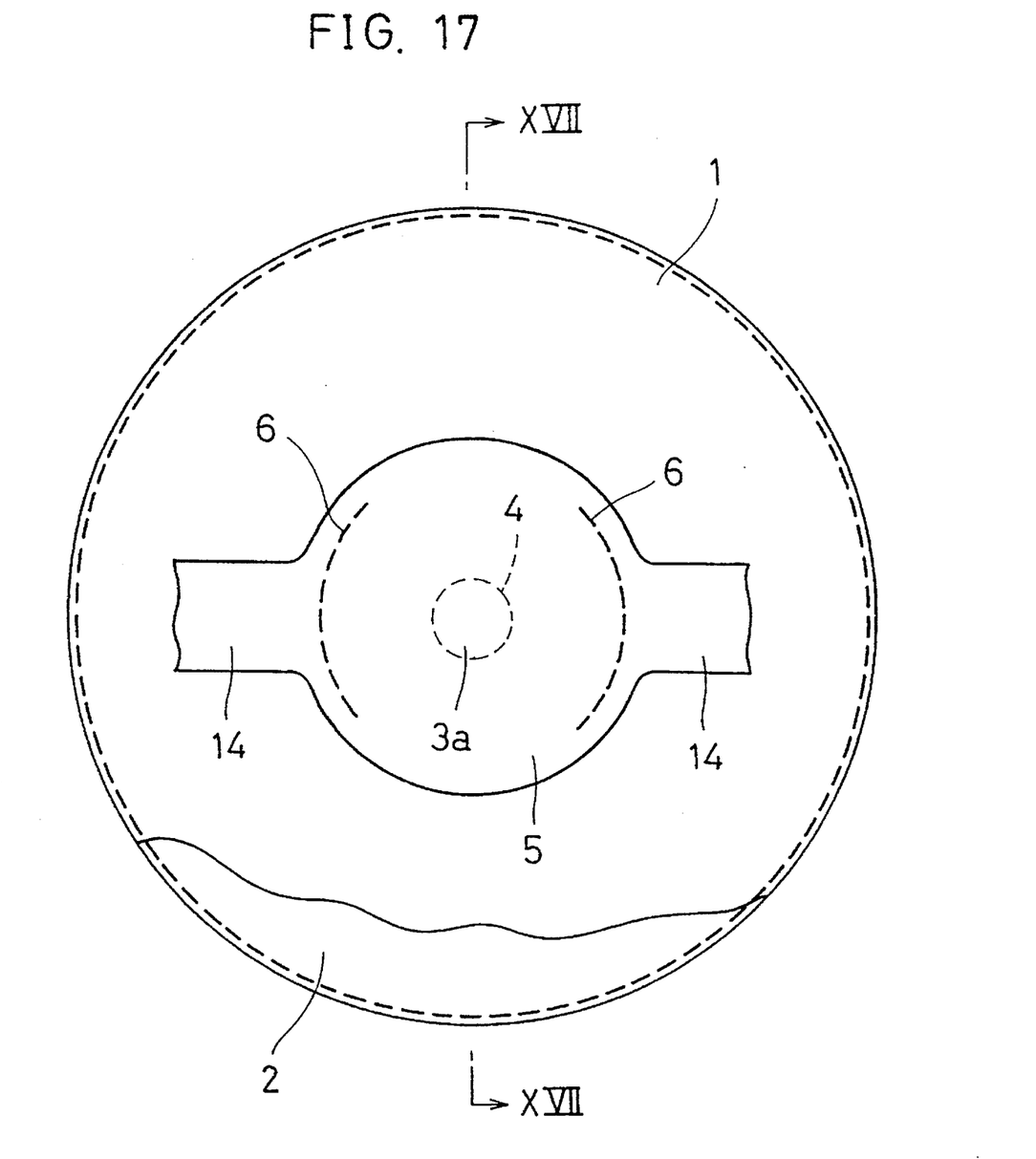
FIG. 17 is a partial plan view, partly cutaway, of a ninth example of an airbag.
Figure 18:
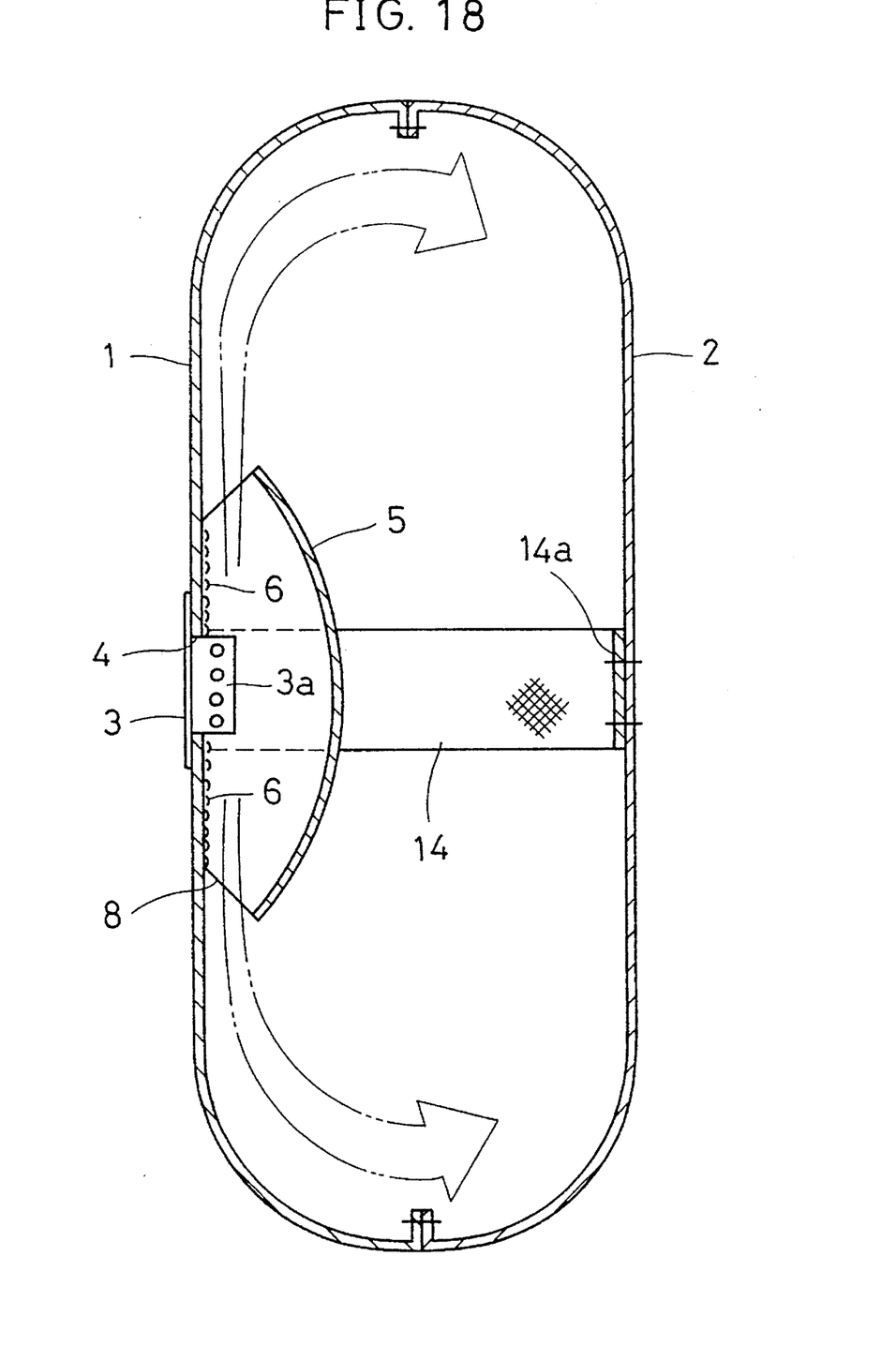
FIG. 18 is a sectional view of the airbag in FIG. 17 taken along XVII—XVII line showing its inflated state.

A ninth example of airbag is illustrated in FIGS. 17 and 18, in which the airbag is further provided with straps 14. As shown in FIG. 17, the internal cloth 5 is seamed partly to the inflator side cloth 1 at opposing positions of the outer marginal portion by the seam lines 6 of about ¼ the outer margin in length. From outside the seamed portions 6, two straps 14 integrally formed with the internal cloth 5 extend up to the occupant side cloth 2 and seamed to the occupant side cloth 2 at their top ends 14a, as shown in FIG. 18. The straps 14 link the inflator side cloth 1 and the occupant side cloth 2 at a predetermined length thereby to regulate the deployment shape of the airbag so as to assume such a flatly splaying shape as illustrated in FIG. 18.

It is possible to construct the straps 14 separately from the internal cloth 5. In that case, the straps 14 can be seamed to the inflator side cloth 1 together with the internal cloth 5 by the seams 6. Otherwise, it is possible to seam the straps 14 direct to the inflator side cloth 1 on the one hand and to the internal cloth 5 on the other hand, thus forming outer and inner seams 6 in the outer perimetric portion of the internal cloth 5.

The number and location of the straps 14 to be used, or the number, length and location of the seamed portions 6 on the internal cloth 5 can be varied and chosen appropriately whenever necessary.

In the airbag thus constructed, the gas discharged from the inflator 3 strikes the internal cloth 5 thereby to flow in radial directions and pass through the non-seamed portions 8, and reaches the outer peripheral part of the airbag. The airbag thenceforth begins to deploy from the outer peripheral part to be fully inflated swiftly, with its attendant action of the straps 14.

On the other hand, the occupant side cloth 2 does not undergo the gas flow directly because of radial dissipation of the gas released from the inflator 3 as described above, and consequently, a tension toward the straps 14 connected to the occupant side cloth 2 is also relieved vastly. In choosing the strength of the straps 14, it is sufficient to take only the internal pressure of the airbag into account, and the breadth, thickness and number of the straps 14 used can be reduced.

Moreover, it is possible to use an unexpensive material of not so high strength as conventional materials. Hence, this is advantageous for the compactization and cost reduction of the airbag passive restraint system.

Throughout the description and preferred embodiments of the invention shown hereinbefore, the airbag is suitable for use in a vehicle seat including a driver's seat, front assistant passenger seat, and rear seat.

Although many preferred embodiments have been described above, it should be understood that this invention is in no sense limited thereby and various modifications or variations thereof can be naturally made.

What is claimed is:

1. An airbag for use in a vehicle occupant restraint system, the vehicle occupant restraint system including an inflator for releasing gas, said airbag including:

a generally circular first cloth having a selected size, a central opening for receiving gas from the inflator and an outer perimeter;

a second cloth having approximately the same size and shape of said first cloth and an outer perimeter, said second cloth being located over said first cloth so as to be directed toward a vehicle occupant and being bound at said outer perimeter thereof to said outer perimeter of said first cloth so as to define an airbag space for containing gas released by the inflator;

an internal cloth having a size smaller than said size of said first cloth and having an outer perimeter, said internal cloth being located over said first cloth central opening and having a plurality of sections along said outer perimeter thereof that are seamed to said first cloth and a plurality of sections along said outer perimeter thereof that are not seamed to said first cloth, wherein said non-seamed sections are located between said seamed sections so that said non-seamed sections define flow passageways through which the gas released by the inflator can flow from underneath said internal cloth into said airbag space, each said flow passageway defining a radial arc around said first cloth central opening; and a plurality of vent holes defined in said first cloth wherein said first cloth is shaped so that said vent holes are located between said outer perimeter of said internal cloth and said outer perimeter of said first cloth and are spaced away from said radial arcs defined by said flow passageways.

2. The airbag of claim 1, wherein said internal cloth has a generally circular shape.

3. The airbag of claim 1, further including straps extending from said seamed sections of said internal cloth for regulating a deployed shape of said airbag, said straps extending from said internal cloth seamed sections to said second cloth to join said first and second cloths at a required length.

4. An airbag for use in a vehicle occupant restraint system, the vehicle occupant restraint system including an inflator for releasing gas, said airbag including:

a generally circular first cloth having a selected size, a central opening for receiving gas from the inflator and an outer perimeter;

a second cloth having approximately the same size and shape of said first cloth and an outer perimeter, said second cloth being located over said first cloth so as to be directed toward a vehicle occupant and being bound at said outer perimeter thereof to said outer perimeter of said first cloth so as to define an airbag space for containing gas released by the inflator; and an internal cloth having a generally circular shape, a size smaller than said size of said first cloth and having an outer perimeter, said internal cloth being located over said first cloth central opening and having a plurality of sections along said outer perimeter thereof that are seamed to said first cloth and a plurality of sections along said outer perimeter thereof that are not attached to said first cloth, wherein said non-attached sections located between said seamed sections so that said non-attached sections define flow passageways through which the gas released by the inflator can flow from underneath said internal cloth and into said airbag space.

5. The airbag of claim 4, wherein said outer perimeter sections of said internal cloth not attached to said first cloth define arcuate sections relative to said first cloth central opening and said first cloth is further formed with a plurality of vent holes, said vent holes being located between said internal cloth outer perimeter and said first cloth outer perimeter and being spaced away from said arcuate sections defined by said internal cloth outer perimeter non-attached sections.

6. An airbag for use in a vehicle occupant restraint system, the vehicle occupant restraint system including an inflator for releasing gas, said airbag including:

a generally circular first cloth having a selected size, a central opening for receiving gas from the inflator and an outer perimeter;

a second cloth having approximately the same size and shape of said first cloth and an outer perimeter, said second cloth being located over said first cloth so as to be directed toward a vehicle occupant and being bound at said outer perimeter thereof to said outer perimeter of said first cloth so as to define an airbag space for containing gas released by the inflator; and an internal cloth having a generally semi-circular shape and an outer perimeter with an arcuate perimeter portion and a straight perimeter portion and being smaller than said size of said first cloth, said internal cloth being located over said first cloth central opening so that said arcuate perimeter portion is located on an upper side of said airbag when mounted to a vehicle, and having a plurality of sections along said arcuate perimeter portion that are seamed to said first cloth and at least one section along said arcuate perimeter portion between said seamed sections that is not seamed to said first cloth, so that said at least one internal cloth arcuate perimeter portion non-seamed section and said internal cloth straight perimeter portion define flow passageways through which gas released by the inflator can flow from underneath said internal cloth and into said airbag space.

7. The airbag of claim 6, wherein said seamed sections of said internal cloth each consist of a main rectilinear or curvilinear seam line with opposed ends that extends in an orthogonally intersecting direction to a radial direction of said first cloth and two curved seam lines, each said curved seam line extending radially outward from a separate one of said main seam line ends.

8. An airbag for use in a vehicle occupant restraint system, the vehicle occupant restraint system including an inflator for releasing gas, said airbag including:

a generally circular first cloth having a selected size, a central opening for receiving gas from the inflator and an outer perimeter;

a second cloth having approximately the same size and shape of said first cloth and an outer perimeter, said second cloth being located over said first cloth so as to be directed toward a vehicle occupant and being bound at said outer perimeter thereof to said outer perimeter of said first cloth so as to define an airbag space for containing gas released by the inflator; and an internal cloth having a reinforcing section of a selected diameter that is located around said first cloth central opening and secured to said first cloth for reinforcing said first cloth around said central opening, a linking part attached to said reinforcing section that has a width less than said diameter of said reinforcing section and a major section attached to said linking part and having a diameter greater than said diameter of said reinforcing section and an outer perimeter, said major section being folded over said first cloth central opening and at least a portion of said internal cloth reinforcing section and being seamed along said outer perimeter thereof to said first cloth at a plurality of spaced apart sections so as to define between said seamed sections and adjacent to said linking part non-seamed sections that function as flow passageways through which gas released by the inflator can flow from underneath said internal cloth major section into said airbag space.

9. The airbag of claim 8, wherein said internal cloth major section has a semicircular perimeter so as to define a portion with a circular perimeter and a portion with a straight perimeter, wherein said internal cloth is mounted to said first cloth so that said semicircular perimeter of said major section is located on an upper side of said airbag and said circular perimeter portion is provided with said seamed sections and said straight perimeter portion is open to form a flow passageway.

10. The airbag of claim 8, wherein said seamed sections of said internal cloth each consist of a main rectilinear or curvilinear seam line with opposed ends that extends in an orthogonally intersecting direction to a radial direction of said first cloth and two curved seam lines, each said curved seam line extending radially outward from a separate one of said main seam line ends.

11. The airbag of claim 8, wherein said first cloth is formed with vent holes located between said internal cloth major section outer perimeter and said first cloth outer perimeter.

12. The airbag of claim 11, wherein said flow through passageways defined by said internal cloth major section non-seamed sections define arcuate sections centered around said first cloth central opening and said vent holes are spaced from said arcuate sections defined by said internal cloth flow passageways.

13. An airbag for use in a vehicle occupant restraint system, the vehicle occupant restraint system including an inflator for releasing gas, said airbag including:

a generally circular first cloth having a selected size, a central opening for receiving gas from the inflator and an outer perimeter;

a second cloth having approximately the same size and shape of said first cloth and an outer perimeter, said second cloth being located over said first cloth so as to be directed toward a vehicle occupant and being bound at said outer perimeter thereof to said outer perimeter of said first cloth so as to define an airbag space for containing gas released by the inflator;

an internal cloth having a size smaller than said size of said first cloth and having an outer perimeter, said internal cloth being located over said first cloth central opening and having a plurality of sections along said outer perimeter thereof that are seamed to said first cloth and a plurality of sections along said outer perimeter thereof that are not attached to said first cloth, wherein said non-attached sections are located between said seamed sections so that said non-attached sections define flow passageways through which the gas released by the inflator can flow from underneath said internal cloth into said airbag space, and each seamed section includes a main seam having a curvilinear or rectilinear line with opposed ends that extends in an orthogonally intersecting direction to a radial direction of said first cloth and two circular arc seam lines, each said circular arc seam line curving radially outwardly from a separate one of said main seam line ends.

14. The airbag of claim 13, wherein said first cloth is formed to define a plurality of vent holes located between said outer perimeter of said internal cloth and said outer perimeter of said first cloth.

15. The airbag of claim 14, wherein said flow passageways defined by said internal cloth non-attached sections define arcuate sections centered around said first cloth central opening and said vent holes are spaced from said arcuate sections defined by said internal cloth flow passageways.

16. An airbag for use in a vehicle occupant restraint system, the vehicle occupant restraint system including an inflator for releasing gas, said airbag including:

a generally circular first cloth having a selected size, a central opening for receiving gas from the inflator and an outer perimeter;

a second cloth having approximately the same size and shape of said first cloth and an outer perimeter, said second cloth being located over said first cloth so as to be directed toward a vehicle occupant and being bound at said outer perimeter thereof to said outer perimeter of said first cloth so as to define an airbag space for containing gas released by the inflator;

an internal cloth having a size smaller than said size of said first cloth and having an outer perimeter, said internal cloth being located over said first cloth central opening and being attached to said first cloth by a continuous stitching alternatively applied within and without said internal cloth outer perimeter so as to define a plurality of internal cloth sections that are seamed to said first cloth and a plurality of sections along said outer perimeter thereof that are not seamed to said first cloth, wherein said non-seamed sections are located between said seamed sections so that said non-seamed sections define flow passageways through which the gas released by the inflator can flow from underneath said interior cloth into said airbag space.

17. The airbag of claim 16, wherein said first cloth is formed to define a plurality of vent holes located between said outer perimeter of said interior cloth and said outer perimeter of said first cloth.

18. The airbag of claim 17, wherein said flow passageways defined by said internal cloth non-attached sections define arcuate sections centered around said first cloth central opening and said vent holes are spaced from said arcuate sections defined by said internal cloth flow passageways.

19. An airbag for use in a vehicle occupant restraint system, the vehicle occupant restraint system including an inflator for releasing gas, said airbag including:

a generally circular first cloth having a selected size, a central opening for receiving gas from the inflator and an outer perimeter;

a second cloth having approximately the same size and shape of said first cloth and an outer perimeter, said second cloth being located over said first cloth so as to be directed toward a vehicle occupant and being bound at said outer perimeter thereof to said outer perimeter of said first cloth so as to define an airbag space for containing gas released by the inflator;

an internal cloth having a size smaller than said size of said first cloth and having an outer perimeter, said internal cloth being located over said first cloth central opening and having a plurality of sections along said outer perimeter thereof that are seamed to said first cloth and a plurality of sections along said outer perimeter thereof that are not attached to said first cloth, wherein said non-attached sections are located between said seamed sections so that said non-attached sections define flow passageways through which the gas released by the inflator can flow from underneath said internal cloth into said airbag space, each said flow passageway defining a radial arc around said first cloth central opening; and at least two straps integrally attached to said internal cloth that extend from said seamed sections of said internal cloth to said second cloth for regulating a deployed shape of said airbag.

20. The airbag of claim 19, wherein said first cloth is formed to define a plurality of vent holes located between said outer perimeter of said internal cloth and said outer perimeter of said first cloth.

21. The airbag of claim 20, wherein said flow passageways defined by said internal cloth non-attached sections define arcuate sections centered around said first cloth central opening and said vent holes are spaced from said arcuate sections defined by said internal cloth flow passageways.

22. An airbag for use in a vehicle occupant restraint system, the vehicle occupant restraint system including an inflator for releasing gas, said airbag including:

a generally circular first cloth having a selected size, a central opening for receiving gas from the inflator and an outer perimeter;

a second cloth having approximately the same size and shape of said first cloth and an outer perimeter, said second cloth being located over said first cloth so as to be directed toward a vehicle occupant and being bound at said outer perimeter thereof to said outer perimeter of said first cloth so as to define an airbag space for containing gas released by the inflator;

an internal cloth having a size smaller than said size of said first cloth and having an outer perimeter, said internal cloth being located over said first cloth central opening and having a plurality of sections along said outer perimeter thereof that are seamed to said first cloth and a plurality of sections along said outer perimeter thereof that are not attached to said first cloth, wherein said non-attached sections are located between said seamed sections so that said non-attached sections define flow passageways through which the gas released by the inflator can flow from underneath said internal cloth into said airbag space, each said flow passageway defining a radial arc around said first cloth central opening;

a plurality of vent holes defined in said first cloth wherein said first cloth is shaped so that said vent holes are located between said outer perimeter of said internal cloth and said outer perimeter of said first cloth and are spaced away from said radial arcs defined by said flow passageways; and a reinforcing cloth integral with said internal cloth and secured to said first cloth around said first cloth vent holes.

23. The airbag of claim 22, wherein said flow passageways defined by said internal cloth non-attached sections define arcuate sections centered around said first cloth central opening, said vent holes are spaced from said arcuate sections defined by said internal cloth flow passageways and portions of said internal cloth defining said reinforcing cloth extend outwardly from portions of said internal cloth defining said seamed sections of said internal cloth.

* * * * *